June 2, 1953   G. GEIER   2,640,267
THEODOLITE
Filed June 30, 1949   2 Sheets-Sheet 1
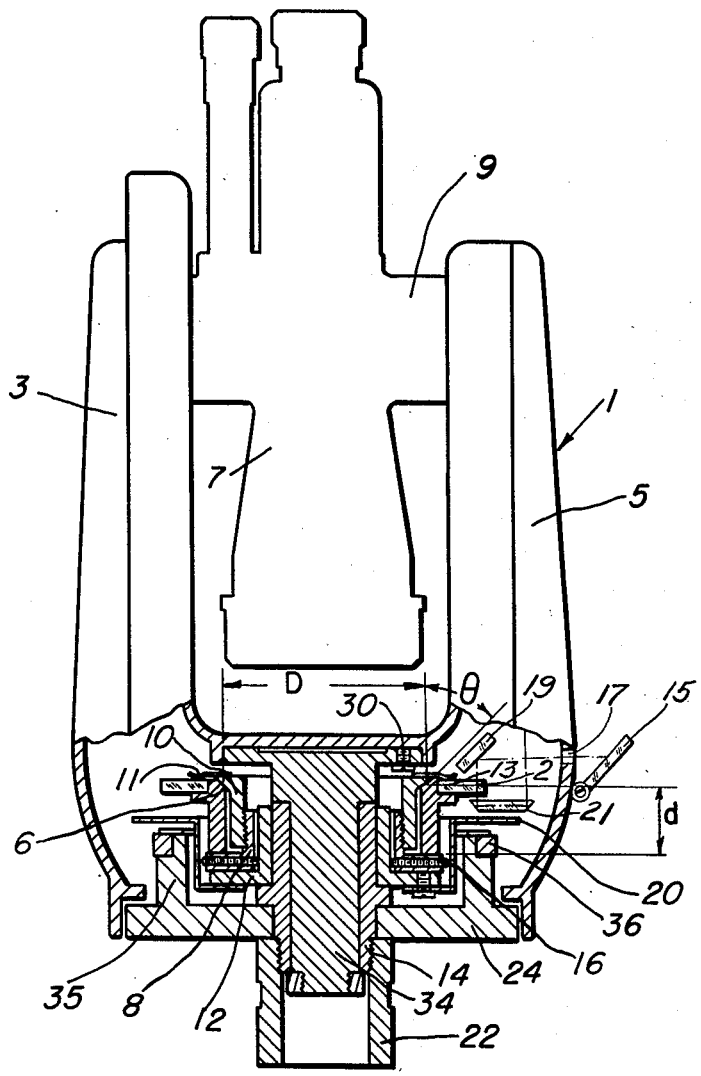
Fig. I
INVENTOR.
GEORGE GEIER
BY J. Russell Juster
ATTORNEY

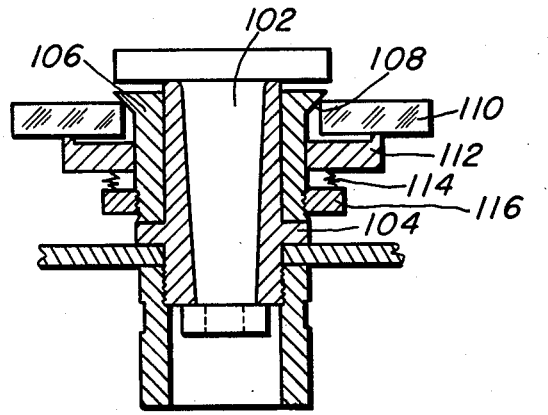
Fig. II
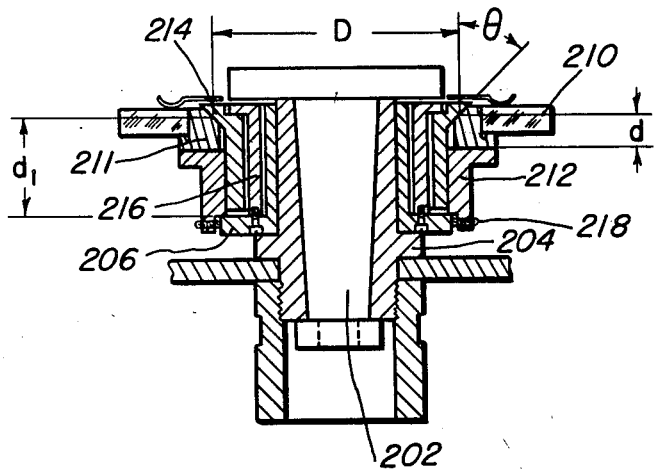
Fig. III
INVENTOR.
GEORGE GEIER
ATTORNEY

Patented June 2, 1953

2,640,267

UNITED STATES PATENT OFFICE 2,640,267

THEODOLITE

George Geier, Ridgefield, N. J., assignor to Keuffel & Esser Company, Hoboken, N. J., a corporation of New Jersey Application June 30, 1949, Serial No. 102,299

9 Claims. (Cl. 33—46)

This invention relates to surveying instruments or theodolites. In certain instruments of this general class which are usually optical reading it has been found advantageous to make the scales, protractors or "circles" of glass provided with radial graduation lines and numerals either by etching or other means. These glass circles are usually made in the form of an annular glass ring having an accurately ground inside diameter. Other vitreous transparent materials such as Pyrex or quartz may be used for these circles. In the instruments provided with such glass circles, it has always been a problem to satisfactorily mount the glass circle to the metal parts of the instrument.

Inasmuch as glass or quartz has a different coefficient of expansion than any of the metals normally used in surveying instruments, temperature changes such as may be encountered in the ordinary use of the instruments which may range from arctic to tropical temperatures will introduce errors or in extreme cases may even break the vitreous transparent circle if the circle is not properly mounted. For example, if as is usually the case the circle is mounted by fitting its accurately ground inside diameter over an outside diameter of a metal mount, increasing temperature will cause the mount to expand more rapidly than the glass and strain the glass and decreasing temperature will cause the mount to contract more rapidly than the glass so that the circle will become loose on the mount permitting it to shift to a position eccentric to the vertical axis of the instrument and thereby introducing eccentricity errors in the readings taken with the instrument. The invention is useful in any instrument where a protractor member or scale is mounted for rotation on parts which have a substantially different coefficient of expansion than the protractor member.

The object of this invention is to provide means for mounting glass circles in theodolites and like instruments which will not strain the circle or allow it to become loose because of temperature changes.

The object and the means by which it is obtained will be more fully understood from the following description taken in connection with the accompanying drawings which are more or less diagrammatic and in which:

Figure I is a view in elevation and partly in section showing a theodolite including one embodiment of the novel circle holding means.

Figure II is a view in diagrammatic sectional elevation showing a second embodiment of the novel circle holding means.

Figure III is a view in diagrammatic sectional elevation showing a third embodiment of the novel circle holding means.

The invention seeks to compensate the effect of temperature changes on a protractor member mounted on a rotatable member having a different coefficient of expansion by causing the protractor member to be moved in the axial direction (vertical in the figures) with respect to the mounting member so that the protractor member will contact and be held at different positions on an inclined surface to compensate for the different expansions of the protractor member and the other member in the radial direction.

Referring to Figure I, the theodolite shown has an alidade 1 mounted for rotation about the vertical axis of the inner center or spindle 34. The alidade 1 includes standards 3 and 5 and a telescope 7. The telescope 7 has a horizontal axle 9 which mounts it for rotation about a horizontal axis. The usual optical means are provided for reading the glass circle 2. A pivoted reflector 15 directs light through the opening 17 to the reflector 19 which directs the light downward through the transparent protractor scale 2 to a reversing prism 21. The reversing prism 21 directs the light upward through the hollow standard 5, whence it is directed through the hollow axle 9 and through the auxiliary eyepiece 23, the reading of the protractor scale 2 being obtained through the eyepiece 23.

The glass circle 2 is carried by mount 4 having the same coefficient of expansion as the glass which for example may be a suitable iron nickel alloy. Iron nickel alloys decrease in coefficient of expansion with increasing nickel content until the composition known as Invar is reached. With greater proportions of nickel the coefficient of expansion again decreases. In this range of nickel content an alloy having the same coefficient of expansion as any of the commercial glasses may be found. Other minor alloying constituents may be added to these iron nickel alloys. The coefficient of expansion of quartz may also be matched with an alloy of this type sufficiently close for practical purposes. The parts 2 and 4 will be considered to make up a protractor member which has a substantially uniform coefficient of expansion. The cylindrical surface 13 of the mount 4 is accurately machined to fit the inside diameter of the glass circle 2. Since the mount 4 is chosen to have the same coefficient of expansion as the glass circle 2 they will fit together at all temperatures. A circular spring 11 or other suitable means may be provided to hold the glass circle 2 on the mount 4.

In some embodiments of the invention, the mount 4 can be omitted in which case the protractor member is made up solely of the glass circle 2. However, the use of a mount 4 of iron-nickel alloy is convenient in the embodiment of Figure I in order to increase the height or axial dimension of the protractor member as will be more fully understood from what is to follow.

The bottom surface of the protractor member comprising the glass circle 2 and the mount 4 rests on the supporting member 8 which is mounted on the outer center 12 for rotation about the middle center or main bearing 14. A holding member 10 is provided with an inclined surface, the conical surface 6, which engages a matching surface on the mount 4. It is not necessary that both the holding member 10 and protractor member be provided with inclined surfaces. For example one or the other of these members may be provided with a conical surface which engages a circular edge on the other member. Surfaces of revolution other than a cone may be useful in certain embodiments. However it is not essential that the inclined surface be a complete surface of revolution. For example three or more plano inclined surfaces spaced within the protractor may be used. The spaced surfaces need not be plano and may be of negligible width approaching a line or an edge formed by two other intersecting surfaces. The holding member is internally threaded to engage an externally threaded sleeve on the supporting member 8. By use of these threads, the spacing of the conical surface 6 and the surface of the supporting member 8 is adjusted at the temperature at which these parts are assembled to hold the protractor member including the mount 4 and the glass circle 2 positively and without strain. Once this spacing has been adjusted the members 8 and 10 may be locked together as for example by inserting a pin radially through the members.

A circular spring 11 secured to the holding member 10 holds the glass circle 2 on the mount 4.

The glass circle 2, mount 4, supporting member 8 and holding member 10 being assembled as described are placed on the annular projection of the outer center 12. Centering screws 16 preferably 4 in number are provided for moving the supporting member 8 radially in two mutually perpendicular directions with respect to the outer center 12. The centering screws 16 are used to adjust the supporting member 8 to such a position as will make the center of the radial graduation lines provided on the glass circle 2 fall on the axis of the cylindrical bearing surface of the outer center 12 which is in accurate bearing contact with an outer cylindrical surface of the middle center or main bearing 14. This adjustment is known in the art as "centering" and various means are known for accomplishing it with great accuracy. When the centering operation is completed the holding member 8 may be secured to the outer center 12 by other screws not in the plane of the section. The outer center 12 also makes thrust bearing contact with an upper surface of a flange provided on the middle center 14. The centering screws may be eliminated in certain embodiments wherein the parts are made with sufficient accuracy so that the centering of the circle is accomplished with the required accuracy merely by putting the parts together.

The middle center or main bearing 14 is formed very accurately, so that its inner and outer bearing surfaces are truly concentric. The inner center or spindle 34 fits accurately within the main bearing 14 and is attached to the alidade 1 as by the screws 30. Thus the spindle 34 by bearing contact with the main bearing 14 assures that the alidade 1 will be turned about the same axis about which the outer center 12 carrying the glass circle 2 may be turned due to the concentricity of the inner and outer bearing surfaces of the main bearing 14.

It is an advantage to use bronze or similar metals for forming the "centers" of a surveying instrument because they may be easily formed or machined and have good bearing properties especially if alloys having some difference in hardness are used in bearing contact with each other. However steel or other metals may also be used. In any event the parts 34, 14, 12, 8 and 10 should be made of materials having substantially the same coefficient of expansion so that no relative movement or straining of the parts occurs as a result of temperature changes. The coefficient of expansion of these parts will be greater than that of the glass circle 2.

The base plate 24 is held between the main bearing 14 and the projection 22. The main bearing 14 extends downward to an externally threaded sleeve and the projection 22 is internally threaded so that these parts may be secured together to hold the base plate 24 as shown. The projection 22 may be inserted in a universal tribach or levelling head not shown by means of which the instrument may be levelled on a tripod. It is of course also possible to make the levelling head a permanent part of the instrument.

An annular support 35 is secured to the flat plate 24 and may be integral therewith as shown. The support 35 holds a clamp ring 36 which may be of a form well known in the art and by means of which the alidade 1 may be clamped to the base of the instrument. A tangent screw not shown may be used in conventional manner with the clamp and clamp ring 36 to permit a fine adjustment of the alidade. A circular spring 20 may be attached to the outer center 12. A pin clamp not shown may then be provided on the alidade which clamps the spring 20 and thereby the outer center carrying the glass circle 2 to the alidade 1 and causes it to be turned therewith. The pin clamp operates to force a pin against the spring 20 bending it slightly and causing it to come in contact with a friction surface. The invention is applicable to other center systems using other clamping and setting devices.

Certain of the important dimensions of the embodiment of Fig. I are indicated on the drawing. One of these is the mean diameter D of the conical engaging surfaces 6. If other forms of inclined surfaces are used the diameter D of an imaginary circle passing through the center of each contact area should be used. Other important dimensions are the angle $\theta$ which the inclined surface 6 makes with the vertical axis, and the vertical or axial distance $d$ from the lower surface of the protractor member, i. e., of the holding member 4 where it makes contact with the supporting member 8 to the height at which the conical engaging surfaces have their mean diameter. In the case where a circular edge contacts a conical surface, the distance $d$ should be measured to the circular edge. In the case where two conical surfaces are in engagement an imaginary circle having a diameter which is the mean of the largest and smallest diameters of the engaging surfaces is taken as a basis of measurement.

It can be readily proved that if the equation:

$$\tan \theta = \frac{D}{2d}$$

is satisfied, the amount by which the axial (vertical) expansion of the holding member 10 exceeds that of the protractor member (in this case the mount 4) will be just enough to compensate the amount by which the diametrical (horizontal) expansion of the holding member exceeds that of the protractor member or mount 4.

If the value of $\theta$ is chosen conveniently as 45°, the axial distance $d$ must equal one half the diameter D. The reason for building up the protractor member from the glass circle mount 2 and the iron nickel mount 4 is now apparent. It is possible to make the protractor member completely of glass provided its thickness is great enough with respect to its inside diameter to permit the equation $$\tan \theta = \frac{D}{2d}$$

to be substantially satisfied. However it is not usually desirable to make the glass circle from such a heavy piece of glass since in most embodiments it must be of good enough optical quality to permit the transmission of image forming rays. The thickness of the protractor member can be held to a minimum by reducing the diameter D.

Referring next to Fig. II a spindle 102 is provided which is suitable for supporting the alidade of a surveying instrument for rotation. The spindle 102 is accurately fitted to the inner bearing surface of the middle center or main bearing 104. The main bearing 104 is provided with a concentric outer bearing surface about which the outer center 106 may rotate. The outer center 106 is provided with inclined surfaces or a conical surface 108.

The protractor member or glass circle 110 rests on the supporting member 112 which fits over the outer center 106 but may slide in the axial (vertical) direction with respect thereto. The supporting member 112 is pushed upward by the resilient member 114 (which may be a metal bellows or spring) so that its inner diameter is held in contact with the conical surface 108. The resilient member 114 is backed by an annular member 116 threaded on the outer center 106. Other clamps, etc., may be added to this embodiment as required. A tension member may be used instead of a compression member for the resilient member 114 to hold the circle 110 in contact with the surface 108. In the construction shown the parts 106, 112 and 116 may be of bronze or the like or of any other bearing metals which may be used in surveying instruments.

In the embodiment of Fig. II it is not necessary that the dimensions conform to any equation such as the equation given in connection with Fig. I since a spring or other resilient member keeps the protractor member in contact with the conical surface 8 for all temperatures. However the member 112 should fit the member 108 well enough so that it cannot tilt thereon but may move in the axial direction only.

In Fig. III, the main bearing 204 is provided with concentric internal and external bearing surfaces. The spindle 202 fits the inner bearing surface accurately and is intended to support the alidade of a theodolite. The outer center 206 fits the outer bearing surface of the main bearing 204. The protractor member is made up of the glass circle 210 and the mount 211 which is made of material having the same coefficient of expansion. The protractor member rests on the supporting member 212 which in turn rests on a flange provided on the outer center 206. Centering screws 218 may be provided which act between the supporting member 212 and the outer center 206 for centering the glass circle 210.

Two sleeves 214 and 216 positioned one within the other as shown serve to hold the protractor member on the supporting member 212. The outer center 206, the supporting member 212 and the holding member or sleeve 214 are of the same material or of materials having the same coefficient of expansion. These parts may for example be of bronze or the like which has good bearing properties, which is readily formed and is commonly used for the "centers" of surveying instruments and which has a higher coefficient of expansion than glass. The holding member 214 is accurately fitted within the supporting member 212 but it is possible for the sleeve 214 to slide with respect to the supporting member 212 in the axial direction. Since the two parts have the same coefficient of expansion, they will remain accurately fitted at all temperatures.

The sleeve or tie member 216 is provided with an annular flange at its upper end which engages the sleeve or holding member 214. The tie member 216 is secured on its lower end to the outer center 206. Thus the tie member 216 holds the holding member 214 so that its conical outer surface engages the conical inner surface of the mount 211. The tie member 216 is made of a material having a higher coefficient of expansion than either the holding member 212 or the protractor member. Sufficient radial clearance should be provided between the sleeves 214 and 216 to allow for differences in radial expansion of these two parts due to the fact that they are made of different materials. A suitable material for the tie member 216 is zinc if the aforementioned parts are of bronze. Therefore during temperature changes a differential expansion takes place between the supporting member 212 and the tie member 216 as well as between the mount 211 and the tie member 216. Consequently the axial movement between the engaging conical surfaces of members 214 and 211 is greater than would result from an embodiment constructed according to Fig. I and having a protractor member of the same effective thickness $d$.

It can be readily shown that the dimensions D, $d$, $d_1$, and $\theta$ should satisfy the following equation for perfect compensation at all temperatures:

$$\tan \theta = \frac{D(C_B - C_G)}{2[d(C_Z - C_G) + (d_1 - d)(C_Z - C_B)]}$$

where $C_B$ = coefficient of expansion of supporting member 212.
$C_G$ = coefficient of expansion of protractor member 210, 211.
$C_Z$ = coefficient of expansion of tie member 216.

The embodiment of Fig. III is useful when it is desired to use a protractor member of less thickness than is required in the embodiment of Fig. I.

In each of the three embodiments, the protractor member may be keyed to the holding member to prevent accidental turning of the protractor member about the holding member.

The three embodiments described in detail are given by way of illustration of the invention. The invention provides a holding means in the art of mounting glass circles in theodolites which may move in an axial direction during temperature changes to compensate for unequal expansions in the diametrical direction. Many variations may be made of the specific embodiments shown within the scope of the invention. The invention has been illustrated with respect to the horizontal circle of a surveying instrument or theodolite which is mounted for rotation about a vertical axis. It may also be used in connection with other graduated circles mounted for rotation about any axis including the vertical circle of a surveying instrument or theodolite which is mounted for rotation about a horizontal axis.

What is claimed is:

1. In a theodolite having a telescope mounted for rotation about an axis, a protractor member of substantially uniform coefficient of expansion provided with graduations for indicating the angular position of said telescope on the axis, a supporting member for said protractor member having a different coefficient of expansion than said protractor member and which is mounted for rotation about the axis, a holding member having substantially the same coefficient of expansion as said supporting member which expands and contracts in a radial direction at a different rate for any temperature variation than said protractor member, said holding member and said supporting member being held together so that said holding member may not move with respect to said supporting member in any but the axial direction, an inclined surface on one of said members positively engaging the other member with substantially uniform pressure regardless of the temperature variation and retaining said protractor member positively and without strain in centered position on the axis for all temperatures and means for reading said protractor member to determine the angular position of said telescope on the axis.

2. In a theodolite having a telescope mounted for rotation about an axis, a protractor member of substantially uniform coefficient of expansion and including a vitreous transparent circle with graduations for indicating the angular position of said telescope on the axis, a support for said protractor member having a different coefficient of expansion than said vitreous transparent circle and which is mounted for rotation about the axis, a holding member for said protractor member having substantially the same coefficient of expansion as said support which expands and contracts in a radial direction at a different rate for any temperature variation than said protractor member, said holding member and said support being held together so that said holding member may not move with respect to said support in any but the axial direction, an inclined surface on one of said members positively engaging the other member with substantially uniform pressure regardless of the temperature variation and retaining said protractor member to hold said vitreous transparent circle positively and without strain in centered position on the axis for all temperatures and means for reading said protractor member to determine the angular position of said telescope on the axis.

3. In a theodolite having a telescope mounted for rotation about an axis, a protractor member of substantially uniform coefficient of expansion and including a vitreous transparent circle provided with graduations for indicating the angular position of the telescope on the axis, a support for said protractor member having a different coefficient of expansion than said vitreous transparent circle and which is mounted for rotation about the axis, a holding member having substantially the same coefficient of expansion as said support secured to said support, a surface inclined to the axis of rotation on one of said members engaging the other member, said surface being so inclined to the axis so that during temperature changes the difference in axial expansion between said holding member and said protractor member causes axial movement between the portion of said holding member which engages said protractor member and the engaging portion of said protractor member to compensate unequal radial expansion of said protractor member and said holding member thereby holding said vitreous transparent circle positively and without strain in centered position on the axis for all temperatures and means for reading said protractor member to determine the angular position of said telescope on the axis.

4. In a theodolite having a telescope mounted for rotation about an axis, a protractor member of substantially uniform coefficient of expansion and including a vitreous transparent circle provided with graduations for indicating the angular position of said telescope on the axis, a support for said protractor member having a different coefficient of expansion than said vitreous transparent circle and which is mounted for rotation about the axis, a holding member having substantially the same coefficient of expansion as said support, a surface inclined to the axis of rotation on one of said members engaging the other member, resilient means urging said holding member in the axial direction and thereby said surface into engagement with the other member, so that during temperature changes the portion of said holding member which engages said protractor member moves axially against the action of said resilient means with respect to the engaging portion of said protractor member to compensate unequal radial expansion of said protractor member and said holding member thereby holding said vitreous transparent circle positively and without strain in centered position on the axis for all temperatures and means for reading said protractor member to determine the angular position of said telescope on the axis.

5. In a theodolite having a telescope mounted for rotation about an axis, a vitreous transparent circle provided with graduations for indicating the angular position of said telescope on the axis, a protractor member including said vitreous transparent circle and a mount therefor of a material having substantially the same coefficient of expansion as said vitreous transparent circle so that said protractor member has a substantially uniform coefficient of expansion, a support for said protractor member having a different coefficient of expansion than said vitreous transparent circle and which is mounted for rotation about the axis, a holding member having substantially the same coefficient of expansion as said support, said holding member and said support being held together so that said holding member may move with respect to said support in the axial direction only, a surface inclined to the axis of rotation on one of said members engaging the other member in such a manner so that during temperature changes the portion of said holding member which engages said protractor member moves axially with respect to the engaging portion of said protractor member to compensate unequal radial expansion of said protractor member and said holding member thereby holding said vitreous transparent circle positively and without strain in centered position on the axis for all temperatures and means for reading said protractor member to determine the angular position of said telescope on the axis.

6. In a theodolite having a vitreous transparent circle provided with graduations, a protractor member including said vitreous transparent circle and an annular mount therefor having an inner conical surface of a material having substantially the same coefficient of expansion as said vitreous transparent circle so that said protractor member has a substantially uniform coefficient of expansion, a support for said protractor member whereon a bottom surface of said protractor member rests and which has a different coefficient of expansion than said vitreous transparent circle and which is mounted for rotation about an axis, a holding member having substantially the same coefficient of expansion as said support secured to said support and having an external conical surface engaging the internal conical surface of said annular mount for said vitreous transparent circle, D being the mean diameter of said engaging conical surfaces, d being the axial distance between the plane at which the diameter of said engaging conical surfaces equals the mean diameter and the bottom surface of said protractor member and θ being the angle which said engaging conical surfaces make with said axis, the equation $$\tan \theta = \frac{D}{2d}$$

being substantially satisfied, so that during temperature changes said internal and external surfaces move axially with respect to each other to compensate unequal radial expansion of said protractor member and said holding member thereby holding said vitreous transparent circle positively and without strain in centered position on the axis for all temperatures.

7. In a theodolite having a vitreous transparent circle provided with graduations, a protractor member including said vitreous transparent circle having an inner conical surface, said protractor member having a substantially uniform coefficient of expansion, a supporting member for said protractor member whereon a bottom surface of said protractor member rests which has a higher coefficient of expansion than said protractor member and which is mounted for rotation about an axis, a holding member having substantially the same coefficient of expansion as said supporting member, having an external conical surface engaging the internal conical surface of said protractor member and being mounted for axial movement with respect to said supporting member, a tie member restraining the axial movement of said holding member with respect to said supporting member having a higher coefficient of expansion than said supporting member, the relative dimensions being chosen so that during temperature changes said internal and external conical surfaces move axially with respect to each other to compensate unequal radial expansion of said protractor member and said holding member thereby holding said vitreous transparent circle positively and without strain in centered position on the axis for all temperatures.

8. In a theodolite having a vitreous transparent circle provided with graduations, a protractor member including said vitreous transparent circle having an inner conical surface, said protractor member having a substantially uniform coefficient of expansion $C_G$, a support for said protractor member whereon a bottom surface of said protractor member rests which has a higher coefficient of expansion $C_B$ than said protractor and which is mounted for rotation about an axis, a holding member having substantially the same coefficient of expansion $C_B$ as said support, having an external conical surface making an angle θ with said axis engaging the internal conical surface of said protractor member at a mean diameter D, the distance from the plane at which said engaging conical surfaces have the mean diameter to the bottom surface of the protractor member being d, said holding member being mounted for axial movement with respect to said support, a tie member having a higher coefficient of expansion $C_Z$ than said support restraining the axial movement of said holding member having axially spaced surfaces one of which is fixed with respect to said holding member and the other of which is fixed with respect to said support, the distance between said spaced surfaces being $d_1$, the equation:

$$\tan \theta = \frac{D(C_B - C_G)}{2[d(C_Z - C_G) + (d_1 - d)(C_Z - C_B)]}$$

being substantially satisfied so that during temperature changes said internal and external conical surfaces move axially with respect to each other to compensate unequal radial expansion of said protractor member and said holding member thereby holding said vitreous transparent circle positively and without strain in centered position on the axis for all temperatures.

9. In a theodolite having a vitreous transparent circle provided with graduations, a protractor member including said vitreous transparent circle and a mount therefor of an iron nickel alloy having substantially the same coefficient of expansion as said vitreous transparent circle so that said protractor member has a substantially uniform coefficient of expansion, a support for said protractor member having a different coefficient of expansion than said vitreous transparent circle and which is mounted for rotation about an axis, a holding member having substantially the same coefficient of expansion as said support, said holding member and said support being held together so that said holding member may move with respect to said support in the axial direction only, a surface inclined to the axis of rotation on one of said members engaging the other member in such a manner so that during temperature changes the portion of said holding member which engages said protractor member moves axially with respect to the engaging portion of said protractor member to compensate unequal radial expansion of said protractor member and said holding member thereby holding said vitreous transparent circle positively and without strain in centered position on the axis for all temperatures.

GEORGE GEIER.

(References on following page)

References Cited in the file of this patent

UNITED STATES PATENTS

| Number | Name | Date |
|---|---|---|
| 1,111,093 | Preddey | Sept. 22, 1914 |
| 1,325,936 | Fouasse | Dec. 23, 1919 |
| 1,958,512 | Egy et al. | May 12, 1934 |
| 2,180,136 | Bates | Nov. 14, 1939 |
| 2,361,741 | Bousky | Oct. 31, 1944 |
| 2,363,877 | Larsen | Nov. 28, 1944 |
| 2,430,551 | Arnold et al. | Nov. 11, 1947 |

FOREIGN PATENTS

| Number | Country | Date |
|---|---|---|
| 430,275 | Great Britain | June 17, 1935 |
| 518,148 | Great Britain | Feb. 19, 1940 |
| 563,872 | Great Britain | Sept. 1, 1944 |
| 759,485 | France | Nov. 16, 1933 |

OTHER REFERENCES

Metals Handbook (1939 edition), published by American Society for Metals, 7301 Euclid Ave., Cleveland, Ohio, pages 465–470, "Low Expansion Alloys."